May 17, 1938.  J. J. DE ROME ET AL  2,117,947
KNOB FASTENING DEVICE
Filed Oct. 22, 1936
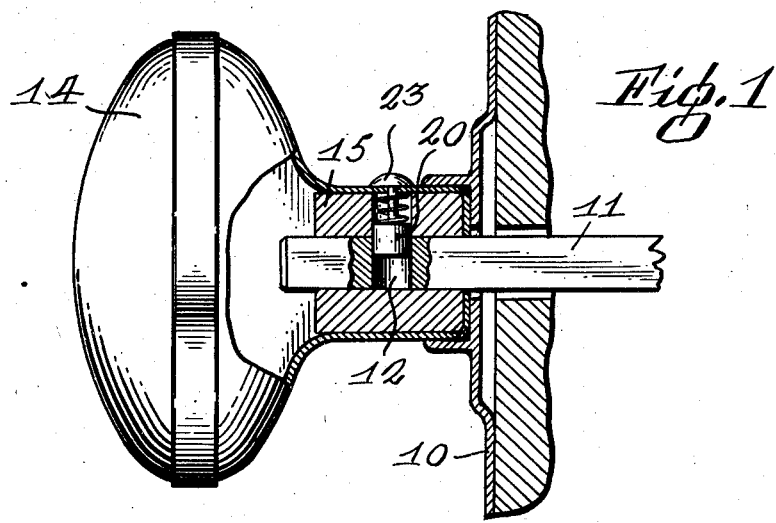
Fig. 1
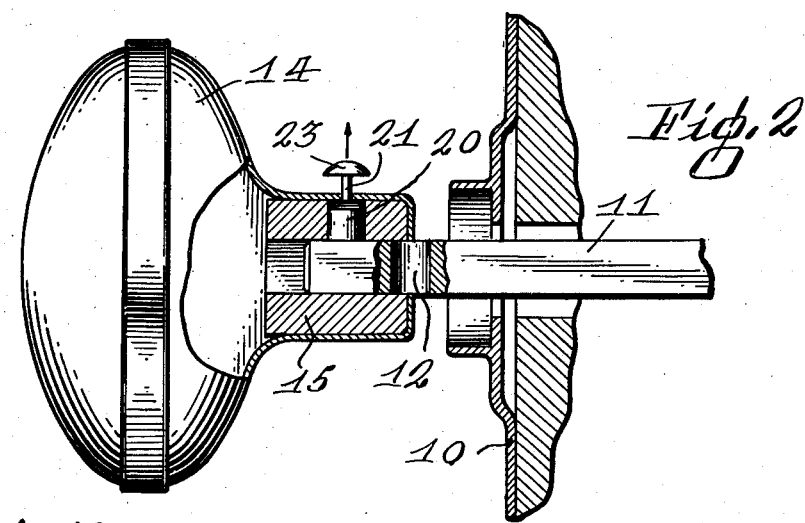
Fig. 2
Fig. 3
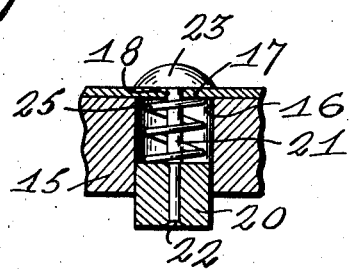
Jean J. DeRome
Léo R. Trepanier
Inventors
By Raymond A. Robic
Attorney Patented May 17, 1938

2,117,947

UNITED STATES PATENT OFFICE 2,117,947

KNOB FASTENING DEVICE

Jean Jules De Rome and Leo R. Trepanier,
Quebec, Quebec, Canada

Application October 22, 1936, Serial No. 107,046

1 Claim. (Cl. 292—352)

The present invention relates to improvements in knob fastening devices and has particular reference to a device for fastening knobs on the spindles of door latches and the like.

An object of the invention is the provision of a fastening device designed to enable relatively quick and convenient connection of a knob on its spindle.

Another object of the invention is the provision of a fastening device which is inseparably mounted on the knob and cannot become detached or lost.

A further object of the invention is the provision of a fastening device which will obviate rough projections which might injure persons operating the knob.

Still another object of the invention is the provision of a fastening device of the aforesaid character which is simple and inexpensive in construction and which is reliable in use.

Other objects and advantages of the invention will become apparent as the description progresses.

In the accompanying drawing forming a part of this specification and in which like reference characters are employed to designate corresponding parts throughout the same:

Figure 1 is a longitudinal section through a knob and spindle assembly, showing the improved fastening device in fastening position thereon, Figure 2 is a similar view showing the fastening device in releasing position and the knob partially removed from the spindle, and Figure 3 is an enlarged fragmentary section through the fastening device and the adjacent structure.

Referring to the drawing, wherein for the purpose of illustration is shown a preferred embodiment of the invention, 10 designates one of the side plates of a conventional door latch and 11 indicates a portion of a common form of latch operating spindle extending through an opening in the side plate. The spindle 11 is preferably rectangular in cross section and is provided with one or more holes 12.

A knob 14 of any preferred form, provided with a shank 15, is adapted to be releasably fastened on the spindle 11. With this in mind, the shank 15 is provided with a longitudinal bore designed to receive a portion of the spindle 11 therein and is provided, in the present instance, with a transverse bore 16 of a diameter approximately corresponding to the diameter of the hole 12 in the spindle. At the outer portion the bore is formed with a web 17 or, as in the present case, a sheet metal covering which covers the entire knob and in which is formed a relatively small hole 18.

In the bore 16 of the shank is slidably fitted a cylindrical metallic core 20 rigidly secured on the inner reduced end of a stem 21, as for instance by a rivet 22. The enlarged portion of the stem is slidable through the reduced hole 18 in the sheet metal covering or web formed on the shank and is provided, at its outer extremity, with a relatively flat rounded head 23, of a diameter greater than that of the hole 18.

A coil spring 25 is arranged about the stem 21 and acts to yieldingly force the core 20 to a projected position so that a portion of the core extends beyond the inner end of the bore 16, as shown at Figure 3.

To assemble the knob on the spindle, the fastener head 23 is pulled outward, so that the spring 25 is compressed and the core 20 is retracted to a position completely within the bore 16. The shank 15 of the knob is then slidably positioned on the projecting end portion of the latch spindle 11 and the head 23 of the fastener is released. When the knob is slidably adjusted so that the core 20 moves into alignment with the selected hole 12 in the spindle, the core is automatically projected to its full extended position and an outer portion thereof enters the hole in the spindle to securely lock the shank and the knob in proper position on the spindle.

As will be apparent, this device will enable very rapid connection or disconnection of the knob relative to the spindle and will securely retain these elements in assembly. Furthermore, the permanent connection of the spring pressed fastening element will obviate the possiblity of accidental removal of the fastener and possible injury due to disconnection of the knob. It will also be noted that the head of the fastener may be of very smooth exterior contour so as to obviate objectional projections and particularly rough edges often formed at the edges of the groove of a fastening screw which have been known to cause injury to persons operating the knob.

It is to be understood that the form of our invention herein shown and described is to be taken as a preferred example of the same, and that various changes as to the shape, size and arrangement of parts may be resorted to without departing from the spirit of the invention or the scope of the subjoined claim.

Having thus described our invention, we claim:—

In a knob fastening device, the combination with a spindle having a transverse hole therein and a knob formed with a shank having a transverse bore in the shank, of a core slidably mounted in the bore of the shank, a stem extending from the inner end of the core through a reduced opening in the shank at the outer end portion of the bore, a spring arranged in the bore adapted to yieldingly force the core to a projected position so that a portion thereof extends beyond the bore and may enter the hole in the spindle, and an enlarged head on the outer extremity of the stem whereby the core may be retracted to a position fully within the bore.

JEAN JULES DE ROME.
LEO R. TREPANIER.